R. E. DOHERTY.
STARTING SYNCHRONOUS MOTORS.
APPLICATION FILED AUG. 12, 1916.
1,331,055.
Patented Feb. 17, 1920.
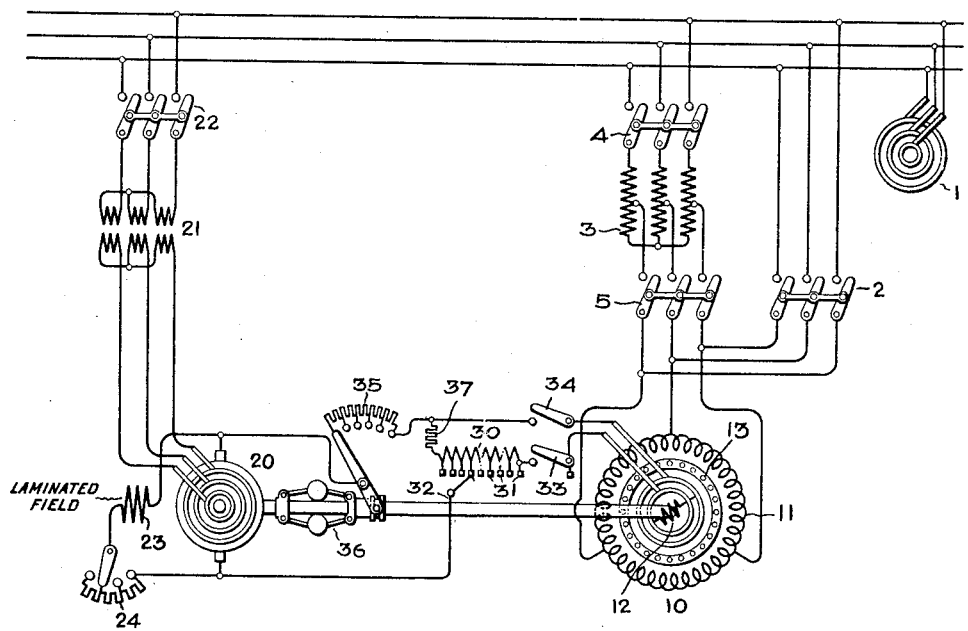
Inventor:
Robert E. Doherty,
by Albert Davis,
His Attorney.

UNITED STATES PATENT OFFICE.

ROBERT E. DOHERTY, OF SCHENECTADY, NEW YORK, ASSIGNOR TO GENERAL ELECTRIC COMPANY, A CORPORATION OF NEW YORK.

STARTING SYNCHRONOUS MOTORS.

1,331,055.   Specification of Letters Patent.   Patented Feb. 17, 1920.

Application filed August 12, 1916. Serial No. 114,608.

*To all whom it may concern:*

Be it known that I, ROBERT E. DOHERTY, a citizen of the United States, residing at Schenectady, county of Schenectady, State of New York, have invented certain new and useful Improvements in Starting Synchronous Motors, of which the following is a specification.

My invention relates to the starting of synchronous dynamo-electric machines and especially to an arrangement of apparatus and method of operation whereby synchronous motors may be readily started under load with good torque and brought into synchronism smoothly and without a rush of current from the source of supply.

Polyphase synchronous motors may be started as induction motors under reduced voltage and brought nearly to synchronism before the closing of the exciting circuit with the accompanying pull into synchronism. This latter action is frequently the cause of a severe jerk and may cause an undesirable draft of current from the source of supply. Further the starting torque under load with such a method of starting is notoriously poor, if the machine is designed to give a good "pull-in" torque and vice versa.

I have, accordingly, conceived that, if single phase alternating current of the frequency of slip, considering the machine as an induction motor, and of proper phase to give maximum torque, is supplied to the exciting winding of a synchronous dynamo-electric machine, the starting, or accelerating, characteristic may be greatly improved while allowing the machine to be designed for good "pull-in" torque characteristics.

The arrangement of apparatus employed and my novel method of operation will be more readily understood from the following specification when taken in connection with the accompanying drawing where the single figure is a diagrammatic view of the apparatus and connections used.

Current is supplied from a source of supply 1 to the armature winding of a polyphase synchronous dynamo-electric machine 10, either directly at full voltage through the disconnecting switch 2 or indirectly at reduced voltage through a compensator 3 and switches 4 and 5. Although I have illustrated my invention as applied to three-phase apparatus it is obviously applicable to any polyphase machine and it will be understood that the armature winding 11 here shown upon the stator, may be mounted upon either the rotor or the stator of the synchronous motor 10. The exciting winding 12, of any desired number of poles so as to correspond to the design of the armature winding, is mounted upon the rotor, which is also preferably provided with a squirrel cage winding 13. Electrical connections to the exciting winding are made by means of customary slip rings and brushes.

Mechanically connected to the motor 10 is a rotary converter 20 which serves both as a frequency changer and a direct current exciter. As shown the motor 10 and converter 20 are direct connected and hence must be designed with the same number of poles. If these machines have a different number of poles, it is only necessary to so interconnect them, as by gears, that they will operate with the corresponding speed ratio. The slip rings of the converter are connected to the source through a step down transformer 21 and a disconnecting switch 22, while its brushes are electrically connected to the exciting winding 12. It is obviously not necessary to use a two-coil transformer to step down the voltage applied to the slip rings of the converter. The exciting winding 23 of the converter, connected in shunt to the brushes, is preferably mounted upon a laminated field structure to avoid hysteresis and eddy-current losses and an adjustable resistance 24 is provided for controlling the current therein.

An auto-transformer 30 having taps 31 and an adjustable connection 32 may be interposed in the circuit between the brushes of the converter and the exciting winding 12 so that the voltage delivered to said winding may be varied. Suitable disconnecting switches 33 and 34 are also shown. In this same circuit I preferably also provide a rheostat 35 which has its arm operatively connected to a centrifugal device 36 by means of which resistance is cut out as the speed increases. This rheostat will preferably be so designed that the ratio of reactance to resistance in the circuit of the exciting winding 12 is maintained substantially constant at all speeds.

When it is desired to start the motor 10, the switches 4, 5, 22, 33 and 34 will be closed. As a result current of the frequency of the source 1 and a reduced voltage will be supplied to the armature winding 11 and the machine will develop torque and perhaps start as an induction motor by reason of the rotating field produced by the polyphase current supplied to the winding 11. As is well understood, the machine will develop torque as an induction motor because of the eddy currents set up in the rotor iron even though no squirrel-cage winding is provided.

Obviously it would be futile to excite the winding 12 with direct current at this time because no useful torque would be produced. I have, however, conceived that a useful torque would be produced and the starting conditions improved if, instead of direct current, a single phase exciting current of the proper phase to give maximum torque and of the frequency of slip were supplied to the exciting winding. Obviously the converter 20, acting as a frequency changer, is operable independently of electrical conditions in the exciting winding 12 to supply such a current because it must necessarily rotate at a speed proportional to that of the motor 10 and because the phase of the current may be predetermined by correctly adjusting the mechanical relation of the rotors of motor and converter. Under such conditions, the excitation of the field of the motor will be reversed in time harmony with the passage of the polar regions of the rotating field in the armature winding 11 over the pole faces so that now a useful torque will be continuously produced and the motor enabled to start under heavy load.

At the moment of starting, the frequency of the exciting current supplied by the converter will be the same as that of the source and hence relatively high. Because of this fact, the reactive drop in the winding 12 will be large and a larger voltage will be required to force through the desired current than when the frequency is low. This can be conveniently cared for by movement of the adjustable connection 32 to the left so that the auto-transformer 30 will increase the voltage supplied by the converter. As the speed increases this connection 32 may be moved to the right to reduce the voltage delivered and, when synchronous speed is reached, the brushes of the converter may be directly connected to the motor slip rings and the auto-transformer cut out by opening the switch 33.

Because of this variable frequency, it may be desirable to provide a resistance 35 for varying the phase relation of the exciting current so as to keep it constant. Preferably I will arrange the rheostat so as to automatically vary the resistance in accordance with the speed to maintain constant the ratio of reactance to resistance in the field circuit and thereby keep the phase of the exciting current constant.

When synchronous speed has been reached and before the switch 33 has been opened, the windings 30 and 12 in parallel offer a low resistance path for the direct current supplied from the brushes of the machine 20. The voltage is determined, however, by the requirements of the field 12. It may be found desirable, therefore, to insert a permanent resistance 37 in the circuit of the auto-transformer 30 to prevent any excessive flow of current.

Although I have herein shown the preferred arrangement and method of operation, I conceive that various modifications and variations will occur to those skilled in the art and that all the devices shown and steps of operation described may not always be essential. Accordingly I do not wish to be limited to the exact arrangement shown and method described but seek to cover in the appended claims all those changes which come within the true scope and spirit of my invention.

What I claim as new and desire to secure by Letters Patent of the United States, is:—

1. In combination, a synchronous dynamo-electric machine provided with an exciting winding, and means operable independently of electrical conditions in said winding for supplying single phase alternating current of the frequency of slip to said winding.

2. In combination, a synchronous dynamo-electric machine provided with an exciting winding, means operable independently of electrical conditions in said winding for supplying single phase alternating current of the frequency of slip to said winding, and means for varying the phase of said exciting current.

3. In combination, a synchronous dynamo-electric machine provided with an exciting winding, means operable independently of electrical conditions in said winding for supplying single phase alternating current of the frequency of slip to said winding, and means for varying the voltage delivered to the exciting winding.

4. In combination, a synchronous dynamo-electric machine provided with an exciting winding, means operable independently of electrical conditions in said winding for supplying single phase alternating current of the frequency of slip to said winding, and means for varying both the phase and voltage of the current delivered to said exciting winding.

5. In combination, a source of supply, a synchronous dynamo-electric machine provided with an armature winding and an exciting winding, means for delivering a variable voltage to said armature winding, a frequency changer mechanically connected to said machine and electrically connected between said source of supply and said exciting winding, and an auto-transformer interposed between said frequency changer and the exciting winding.

6. In combination, a source of supply, a synchronous dynamo-electric machine provided with an armature winding and an exciting winding, means interposed between said source and said armature winding for varying the voltage supplied thereto, a rotary converter mechanically connected to said machine supplied with current from said source of supply, and having its brushes connected to said exciting winding, and means for disconnecting said converter from said source.

7. The method of accelerating a synchronous dynamo-electric machine having an armature winding and an exciting winding which consists in supplying polyphase alternating current to said armature winding and in supplying independently of the electrical conditions of said exciting winding single phase alternating current of slip frequency and of proper phase to produce torque between said armature winding and said exciting winding to said exciting winding.

8. The method of accelerating a synchronous dynamo-electric machine having an armature member provided with a polyphase winding and a field member provided with an exciting winding, which consists in supplying polyphase alternating current to said armature winding and in supplying independently of the electrical conditions of said exciting winding single phase alternating current of slip frequency to said exciting winding and in approximately maintaining a predetermined phase relation between the current supplied to said exciting winding and the rotating field developed by said armature winding.

9. The method of starting a synchronous motor mechanically connected to a frequency changer which consists in supplying current of a reduced voltage to the armature winding of said motor and substantially simultaneously supplying single phase current of the frequency of slip to the exciting winding of said motor, and then increasing the voltage applied to said armature winding.

10. The method of starting a synchronous motor having a frequency changer mechanically connected thereto, from a source of supply of relatively fixed voltage and frequency, which consists in applying a reduced voltage to the armature winding of said motor and substantially simultaneously supplying current of the frequency of slip from said frequency changer to the exciting winding of said motor, and then reducing the voltage applied to said exciting winding, and increasing the voltage applied to said armature winding.

11. The method of starting a synchronous motor which consists in applying a reduced voltage to its armature winding and supplying current of the frequency of slip to its exciting winding, and then maintaining the ratio of resistance to reactance in the circuit of said exciting winding substantially constant as said motor starts.

12. The method of starting a synchronous motor which consists in applying a reduced voltage to its armature winding and supplying current of the frequency of slip to its exciting winding, and then maintaining the ratio of resistance to reactance in the circuit of said exciting winding substantially constant as said motor starts, and finally applying full voltage to said armature winding and supplying direct current to said exciting winding.

13. The method of starting a synchronous motor having a rotary converter mechanically connected thereto, which consists in supplying current of normal frequency and reduced voltage to the armature winding of said motor and simultaneously causing said converter to supply single phase current of the frequency of slip and of a voltage greater than normal to the exciting winding of said motor, then decreasing the voltage applied to the exciting winding of said motor as the speed thereof increases and increasing the voltage applied to the armature winding, and finally causing said rotary converter to operate as a direct current generator to excite the exciting winding of said motor.

In witness whereof I have hereunto set my hand this 11th day of August, 1916.

ROBERT E. DOHERTY.